United States Patent [19]

Greer

[11] Patent Number: 4,998,829

[45] Date of Patent: * Mar. 12, 1991

[54] ROTARY DIE SLOT ADJUSTABLE GIB ASSEMBLY

[75] Inventor: Larry J. Greer, Chesterfield, Mo.

[73] Assignee: Allied Gear and Machine Co., Inc., St. Louis, Mo.

[ * ] Notice: The portion of the term of this patent subsequent to Aug. 22, 2006 has been disclaimed.

[21] Appl. No.: 261,917

[22] Filed: Oct. 24, 1988

[51] Int. Cl.⁵ .............................................. F16C 23/00
[52] U.S. Cl. ...................................... 384/255; 83/670; 83/699; 101/216; 101/247; 384/258
[58] Field of Search ............... 101/375, 216, 218, 219, 101/150, 153, 178, 247, 377; 83/699, 670, 859; 100/161; 384/255, 258, 229

[56] References Cited

U.S. PATENT DOCUMENTS 4,859,087 8/1989 Greer ............................... 384/258 X Primary Examiner—Edgar S. Burr
Assistant Examiner—Moshe I. Cohen
Attorney, Agent, or Firm—Cohn, Powell & Hind

[57] ABSTRACT

A sideframe (12) of a printing press has a slot (18) having opposed elongate grooves (30, 32) receiving an adjustable gib (14) and a fixed gib (16) respectively for receiving a rotary die journal bearing block (10) therebetween in sliding movement. The adjustable gib has a stem (38) received within the associated side groove (30) and attached by adjustment fasteners (40), each of which includes an eccentric portion (42) received with an associated stem opening (48) to move adjustable gib relative to fixed gib which has a stem (56) received within the associated side groove (32) and attached by fasteners (58), to vary the width of the slot. The adjustable gib includes an elongate groove (54) which receives a bearing block key (86) said key being attached to said bearing block by an adjustment fastener (74) to permit lateral adjustment of said bearing block relative to said sideframe.

6 Claims, 1 Drawing Sheet

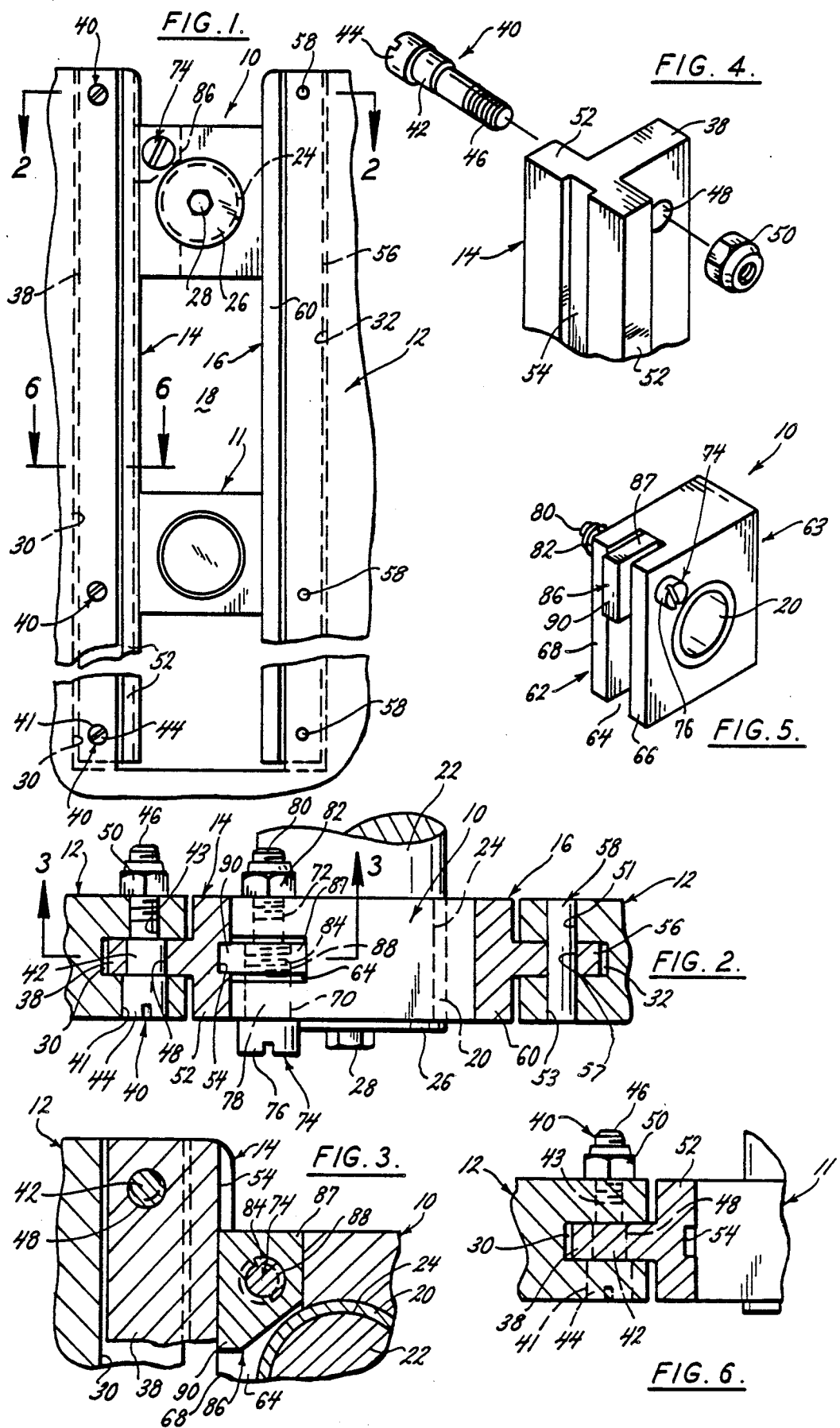

ROTARY DIE SLOT ADJUSTABLE GIB ASSEMBLY

BACKGROUND OF THE INVENTION

This invention relates generally to a device for adjusting the width of the slot receiving a printing press rotary die journal block and more particularly to the provision of adjustable gibs defining the slot sides.

Web-fed printing press dies which have on their surface engraved patterns are placed in contact with a hardened anvil roll with the web therebetween. The rotary die ends are carried by journal bearing blocks which are mounted in sliding relation in slots formed in the sideframes provided on each side of the printing press. The rotary dies and therefore the bearing blocks require accurate alignment with the anvil cylinder for the proper operation of the printing press.

In the past, the sideframe slots have been simple rectangular openings located so that when the rotary die bearing blocks are emplaced the die will be automatically aligned parallel to the mating anvil cylinder. In order to install and remove dies over the life of the press it is necessary to provide sufficient tolerance between the bearing block and the slot to accomplish this which requires accurate machining. It will be readily understood that as the press ages the slots become looser due to wear and damage and the original alignment is lost. This condition is even more pronounced on aluminum and cast iron sideframes and no inexpensive procedure for curing the problem exists.

This die slot adjustment device solves these and other problems in a manner not revealed in the known prior art.

SUMMARY OF THE INVENTION

This printing press rotary die bearing block slot adjustment device provides for the adjustment of slot width by means of a widthwise adjustable side member or gib. On one side of the slot a fixed but replaceable gib insert is provided, on the other side an adjustable gib insert is provided so that during the assembly of the press and throughout its life an operator can adjust the slot width to provide the desired fit without the need for precision machining when cutting the die slots in the sideframes.

The provision of replaceable and adjustable gib inserts permits the use of aluminum and other softer materials rather than steel for the entire sideframe by virtue of the use of steel inserts for the sideframe slot wear surfaces, the sideframe slot sides being adapted to receive the gib inserts.

The improvement provides for widthwise movement of one of the gib inserts by means of a plurality of adjustment fasteners having eccentric camming.

The improvement further provides that one gib can include a longitudinal groove on its face so that the system can be used in conjunction with a laterally adjustable bearing block having a key interengageable with said groove.

It is an aspect of this invention to provide support means including a bearing block slot having opposed first and second sides, each of said sides having elongate groove means; opposed first and second elongate gib members each associated with said first and second sides, each gib member including a first portion received by its associated groove means, and a second bearing block engageable portion, and means connecting said first and second gib members to said slot sides, said means connecting said first gib member including means moving said first portion of first gib member into and out of said groove means to vary the distance between the second portions of said gib members.

It is another aspect of this invention to provide that each of said groove means includes at least one elongate groove side portion having a plurality of openings; each of said gib member first portion includes a plurality of openings disposed adjacent said groove side portion openings, and said moving means includes a plurality of rotatable fasteners each having a first portion received by an opening in said groove side portion and a second adjacent portion received in the adjacent opening of said gib first portion, one of said fastener portions being axially eccentric to said other of said fastener portions whereby rotation of said fasteners causes side movement of said gib member relative to said support means.

It is yet another aspect of this invention to provide that said elongate groove means of each of said sides includes opposed elongate groove side portions defining a single groove and having a plurality of longitudinally spaced axially aligned openings, and said gib members are generally Tee-shaped and include a stem providing said first portion and a head providing said second portion.

It is still another aspect of this invention to provide that each of said fasteners of said moving means includes a head and a nut said nut being received by said fastener to substantially preclude axial movement but to permit rotational movement.

It is another aspect of this invention to provide that said means connecting said second gib member includes a plurality of fasteners attaching said first portion of said second gib member to said groove means in fixed relation but permitting removal and replacement of said second gib member.

In another aspect of this invention a journal bearing block is provided including opposed sides, one of said sides including a laterally adjustable key, and said head of said first gib member includes an elongate groove receiving said key in sliding relation.

It is an aspect of this invention to provide an adjustable gib assembly which is relatively easy and inexpensive to manufacture, simple to install and effective in operation.

BRIEF DESCRIPTION OF THE DRAWINGS

FIG. 1 is an elevational view of a sideframe having an adjustable gib system;

FIG. 2 is a cross-sectional view taken on line 2—2 of FIG. 1;

FIG. 3 is a fragmentary sectional view taken on line 3—3 of FIG. 2;

FIG. 4 is a fragmentary perspective view of an adjustable gib;

FIG. 5 is a perspective view of a laterally adjustable journal bearing block, and FIG. 6 is a fragmentary cross-sectional view taken on line 6—6 of FIG. 1.

DESCRIPTION OF THE PREFERRED EMBODIMENT:

Referring now by reference numerals to the drawing and first to FIG. 1 it will be understood that an upper laterally adjustable rotary die journal bearing block 10 is shown which is mounted in sliding relation between the opposed elongate rails or gibs 14 and 16 defining the slot 18 of the sideframe 12 of a printing press. A lower, anvil cylinder journal bearing block 11 which is substantially similar to said upper bearing block but which is not laterally adjustable is also mounted in sliding relation between said gibs.

The sideframe 12 shown, which constitutes a support means, is on the operator side of the press and a similar set of gibs is provided for the gearside sideframe (not shown). Also, a conventional journal bearing block, similar to block 11, is provided for the gearside sideframe.

The bearing block 10 includes a bushing 20 and the rotary die journal 22 includes a reduced diameter end portion 24 which is received within said bushing 20. An end member 26 is provided, attached to said journal end portion 24 by a machine bolt 28 such that said journal is rotatable in said bushing but is substantially precluded from lateral movement relative to said bearing block 10.

The journal block 10 and the side gibs 14 and 16 will now be more specifically described. The sideframe 12 is provided with opposed elongate grooves 30 and 32 receiving, respectively, Tee-shaped gibs 14 and 16. Gib 14 is adjustable and gib 16 is fixed but replaceable. Gib 14 includes a tang or stem 38 received in push-fit relation within associated elongate sideframe groove 30. The gib 14 is attached to sideframe 12 by a plurality of adjustment fasteners in the form of bolts 40 each of which, as best shown in FIGS. 2 and 4, includes an eccentric circular portion 42, disposed intermediate the head 44 and the threaded shaft 46. The adjustment fasteners 40 are each received within axially aligned openings 41 and 43 provided in the sides of the sideframe groove 30 and within a circular opening 48 provided in the stem 38. Opening 41 is sized to receive the fastener head 44, and is aligned with opening 43. The adjustment fasteners 40 are each provided with a nut 50 which is arranged to permit rotation of said eccentric portion 42 within said opening 48 without loosening said adjustment fastener. The gib 14 also includes a head 52, which is engageable with the bearing block 10 and which includes a groove 54 cooperating with a corresponding groove in the bearing block 10 as will be hereinafter described. The other gib 16 includes a stem 56 received in push-fit relation with associated elongate groove 32. The gib 16 is attached to the sideframe 12 by a plurality of fasteners in the form of dowel pins 58 which are received within axially aligned openings 51 and 53, provided in the sides of the sideframe groove 32, and within circular openings 57 provided the stem 56. The gib 16 also includes a head 60 which is engageable with the bearing block 10. With this structural arrangement of parts adjustment of the width of the sideframe slot is accomplished by rotating fasteners 40 sequentially using a gauge to ensure that the gibs 14 and 16 maintain a parallel attitude.

The bearing block 10 is best shown by reference to FIGS. 2 and 4 and, as shown, includes opposed sides 62 and 63, said side 62 including a groove 64, which is disposed adjacent said gib head groove 54 but is wider than said elongate groove 54. Bearing block groove 64 is defined by laterally adjacent sides 66 and 68 which are provided with openings 70 and 72 respectively receiving an adjustable fastener in the form of a machine bolt 74. Fastener 74 includes an unthreaded portion 78 adjacent the head 76 and received within the opening 70. A threaded end portion 80 is received within the opening 72 adjacent the nut 82 and a larger diameter threaded portion 84 is disposed between said portions 78 and 82 substantially within the bearing block groove 64.

A key 86 is carried by the bearing block 10, said key having a first portion 87 substantially narrower than and received within the bearing block groove 64, said key including a threaded opening 88 receiving the fastener portion 84 in adjustable threaded relation. The key 86 has an outwardly extending second portion 90 which is substantially the same width as, and is a close sliding fit within, the gib head groove 54. The fastener nut 82 is arranged to permit rotation of said fastener 74 without loosening said fastener such that, as the fastener 74 is rotated, the key 86 travels across the groove 64. In the embodiment shown the key 86 is of uniform thickness and has the bottom portion cut away to avoid the bearing block bushing 20.

Because the bearing block sides 62 and 63 are a close fit within the spaced heads of gibs 14 and 16 and the key 86 is a close fit within gib head groove 54, the bearing block 10 moves laterally relative to the gibs 14 and 16 carrying the rotary die journal 22, and therefore the die as a whole, with it as the fastener 74 is rotated. As will be readily understood the spacing of the gibs 14 and 16 can be adjusted by means of the adjustable fasteners 40 which provides the advantage that close tolerance machining of related parts is unnecessary.

This structural arrangement of parts is described in co-pending application Ser. No. 07/262,433, now U.S. Pat. No. 4,859,087, which is incorporated herein by reference.

The installation of the fixed and adjustable gibs is very simple. The fixed gib 16 is located with its stem 56 received within the side frame groove 32 and fixed in position by fasteners 58. The adjustable gib 14 is located with its stem 38 received within the sideframe groove 30. Adjustable fasteners 40 are placed in position with the circular eccentric portion 42 received within the circular stem opening 48. A gage block (not shown) representing the preferred slot width is inserted between the gibs 14 and 16 and the adjustable gib 14 is then moved into engagement with said gage block by appropriate rotation of the adjustment fasteners 40. This arrangement provides that readjustment of the gibs can be made throughout the life of the press and damaged gibs can be replaced as necessary.

The installation of this adjustable bearing block assembly is very simple. The workside bearing block 10 is slipped onto the workside journal 22 of the rotary die and the opposite gearside bearing block (not shown) is slipped onto the gearside journal. The rotary die is then lowered with its bearings in place into associated sideframe slots. Having been previously adjusted, bearing block 10 is received between previously adjusted gibs 14 and 16 such that the key 86 is received within the gib head groove 54. Following this, the rotary die hold down units are installed such as those which are described in copending application Serial No. 07/261,918. Lateral adjustment is easily accomplished when the press is running by turning the adjustment fastener 74. The key 86 remains fixed in lateral position and thus the bearing block moves laterally and carries the die with it. For set-up purposes, it will be readily understood that adjustment must be made prior to the application of hold down pressure.

In view of the above it will be understood that various aspects and features of the invention are achieved and other advantageous results are attained. While a preferred embodiment of the invention has been shown and described, it will be clear to those skilled in the art that various modifications may be made without departing from the invention in its broader aspect.

I claim as my invention:

1. An adjustable gib assembly slot for a rotary die journal bearing block, comprising:
   (a) support means including a bearing block slot having opposed first and second sides, each of said sides having elongate groove means,
   (b) opposed first and second elongate gib members each associated with one of said first and second sides, each gib member including a first portion received by its associated groove means, and a second bearing block engageable portion, and
   (c) means connecting said first and second gib members to said slot sides, said means connecting said first gib member including means moving said first portion of first gib member into and out of said groove means to vary the distance between the second portions of said gib members.

2. An adjustable slot as defined in claim 1, in which:
   (d) each of said groove means includes at least one elongate groove side portion having a plurality of openings,
   (e) each of said gib member first portion includes a plurality of openings disposed adjacent said groove side portion openings, and
   (f) said moving means includes a plurality of rotatable fasteners each having a first portion received by an opening in said groove side portion and a second adjacent portion received in the adjacent opening of said gib first portion, one of said fastener portions being axially eccentric to said other of said fastener portions whereby rotation of said fasteners causes side movement of said gib member relative to said support means.

3. An adjustable slot as defined in claim 1, in which:
   (d) said elongate groove means of each of said sides includes opposed elongate groove side portions defining a single groove and having a plurality of longitudinally spaced axially aligned openings,
   (e) said gib members are generally Tee-shaped and include a stem providing said first portion and a head providing said second portion, said stem having a plurality of longitudinally spaced openings disposed between said groove side openings, and
   (f) said moving means includes a plurality of rotatable fasteners including a first portion received by said groove side portion openings and a second portion received by said stem openings, one of said fastener portions being axially eccentric to the other of said fastener portions whereby rotation of said fasteners causes side movement of said gib member relative to said support means.

4. An adjustable slot as defined in claim 3, in which:
   (g) each of said fasteners of said moving means includes a head and a nut said nut being received by said fastener to substantially avoid axial movement but to permit rotational movement.

5. An adjustable slot as defined in claim 3, in which:
   (g) said means connecting said second gib member includes a plurality of fasteners attaching said first portion of said second gib member to said groove means in fixed relation but permitting removal and replacement of said second gib member.

6. An adjustable slot as defined in claim 3, in which:
   (g) a journal bearing block is provided including opposed sides, one of said sides including a laterally adjustable key, and
   (h) said head of said first gib member includes an elongate groove receiving said key in sliding relation.

* * * * *

UNITED STATES PATENT AND TRADEMARK OFFICE
CERTIFICATE OF CORRECTION

PATENT NO. : 4,998,829

DATED : March 12, 1991

INVENTOR(S) : Greer

It is certified that error appears in the above-identified patent and that said Letters Patent is hereby corrected as shown below:

Column 5, line 19, before "first" add --said--.

Signed and Sealed this

First Day of September, 1992

*Attest:*

DOUGLAS B. COMER

*Attesting Officer*     *Acting Commissioner of Patents and Trademarks*